United States Patent [19]

Cohen

[11] Patent Number: 5,664,750
[45] Date of Patent: Sep. 9, 1997

[54] CAMERA MOUNT

[76] Inventor: Edward Cohen, 6021 Fountain Park La. #10, Woodland Hills, Calif. 91367

[21] Appl. No.: 557,830

[22] Filed: Nov. 14, 1995

[51] Int. Cl.$^6$ ............................................. F21L 15/08
[52] U.S. Cl. .......................... 248/231.71; 248/229.15; 248/288.31
[58] Field of Search ............................ 248/276.1, 278.1, 248/288.31, 290, 181.1, 288.51, 231.71, 229.15, 514, 535, 207

[56] References Cited

U.S. PATENT DOCUMENTS

| | | | |
|---|---|---|---|
| 1,460,697 | 7/1923 | Bendlin | 248/276.1 |
| 2,510,198 | 6/1950 | Tesmer | 248/274.1 |
| 2,650,788 | 9/1953 | Hulstein | 248/231.71 |
| 2,950,836 | 8/1960 | Murdock | 248/229.15 |
| 3,428,286 | 2/1969 | Pesco | 248/278.1 |

FOREIGN PATENT DOCUMENTS

| | | | |
|---|---|---|---|
| 771193 | 10/1934 | France | 248/231.71 |
| 877696 | 9/1961 | United Kingdom | 248/229.15 |

*Primary Examiner*—Leslie A. Braun
*Assistant Examiner*—Kimberly T. Wood
*Attorney, Agent, or Firm*—Terrance L. Siemens

[57] ABSTRACT

A camera mount is disclosed that includes a base clamp, with a pair of opposing adjustable gripping surfaces to engage an environmental support, such as a bookshelf or a tree branch. In the preferred embodiment, removably attached to the base, is an adaptor designed to receive the mast portions of the device. The adaptor has a plurality of apertures for receiving the first mast portion, thus increasing the possible angles at which the masts can be set relative to the base clamp. Additionally, in the preferred embodiment, each of the mast portions has an integral ball joint that allows the mast to have a "zig-zag" shape through various angles, if desired. This allows the field of view of the camera to avoid intervening obstacles, and aids in concealment, if desired. In a second embodiment of the invention, the adaptor and masts are replaced by a resiliently deformable "goose neck" arrangement.

5 Claims, 3 Drawing Sheets

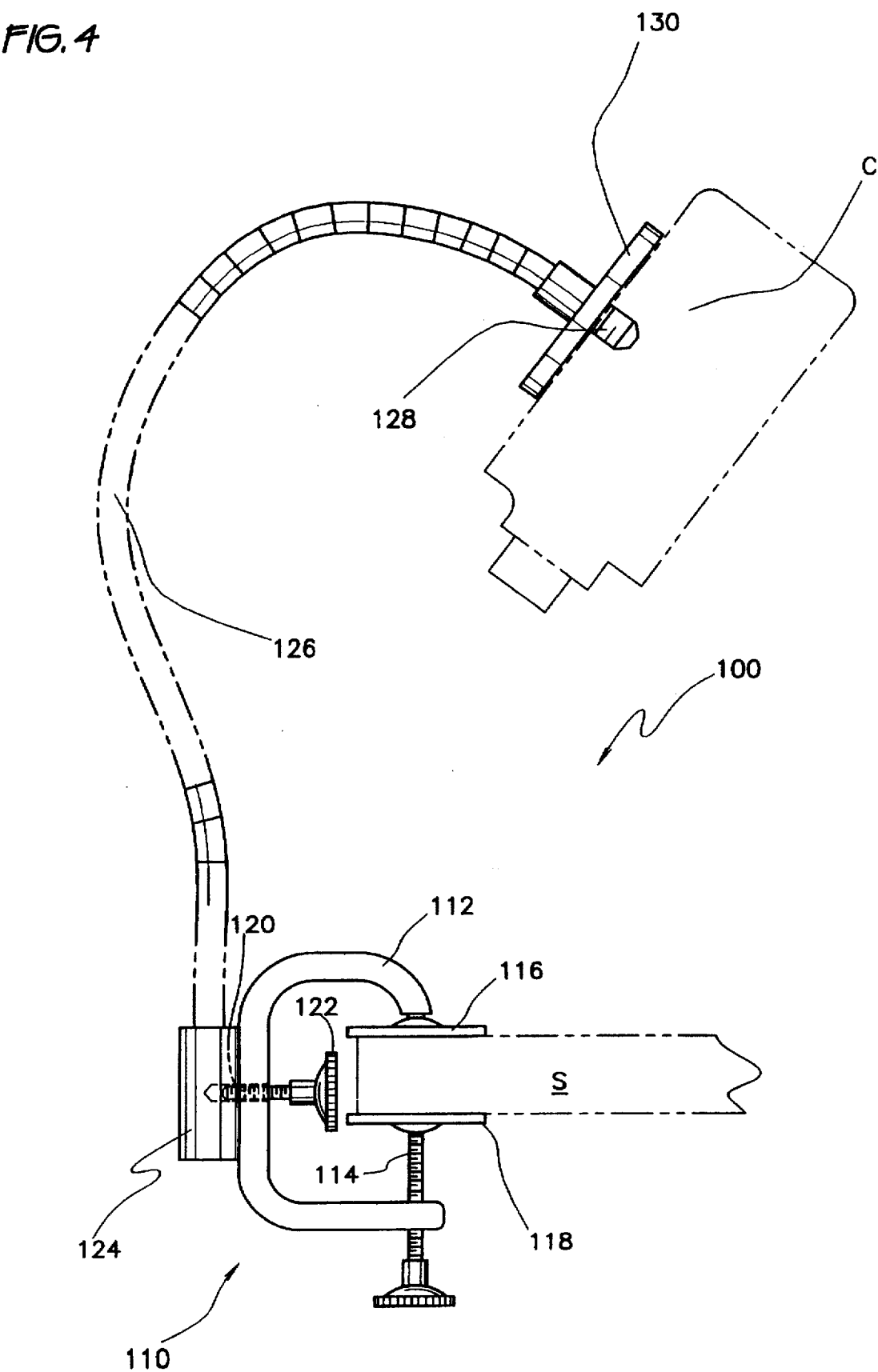

CAMERA MOUNT

BACKGROUND OF THE INVENTION

1. Field of the Invention

The present invention relates generally to securement devices. More specifically, it relates to a securement device for video or still cameras. Even more specifically, it relates to a device that would allow a video or still camera to be fixed in a wide variety of positions and angles relative to the surface that the camera is attached to. More generally, the device could be used to secure any type object in a fixed position relative to a support surface. For example, the mount described herein could easily be used to position a fishing rod so that it could extend under low lying branches at the edge of a body of water.

Thus it can be seen that the potential fields of use for this invention are myriad and the particular preferred embodiment described herein is in no way meant to limit the use of the invention to the particular field chosen for exposition of the details of the invention.

A comprehensive listing of all the possible fields to which this invention may be applied is limited only by the imagination and is therefore not provided herein. Some of the more obvious applications are mentioned herein in the interest of providing a full and complete disclosure of the unique properties of this previously unknown general purpose article of manufacture. It is to be understood from the outset that the scope of this invention is not limited to these fields or to the specific examples of potential uses presented hereinafter.

2. Description of the Prior Art

In many applications for automatic or remote camera operation, a desire for concealment of the camera or an environment which occasions difficult camera angles relative to a stable camera support are encountered. The first case would be in a security or surveillance situation, where the visibility of the camera needs to be minimized. The second case would be occasioned in a wildlife photography shoot, for instance, where the animals involved are shy of humans, live in a biological niche that is difficult to reach or to stay in for any length of time (high treetops, for example), or are dangerous. The present invention attempts to provide an improved camera mount that allows the user to position the camera in a number of ways such that concealment of the camera and/or obstacles to a free field of view to the lens (vegetation and the like) that cannot support the weight of the camera may be circumvented. A search in the united States Patent and Trademark Office uncovered a number of patents that relate to adjustable mountings and these are discussed hereinafter:

U.S. Pat. No. 4,439,032 issued on Mar. 27, 1984 to Jon M. Congdon discloses a portable camera support. This has a conventional mounting system that includes a strap and extendible leg combination. Unlike the instant invention, there is no disclosure of a plurality of ball joints integral with an equal number of mast portions to provide for a greater number of sections that can be angled in relation to one another along the entire mast extending from the instant invention's base.

In U.S. Pat. No. 4,684,230 issued on Aug. 4, 1987 to Steven A. Smith there is disclosed a collar for retaining a camera bracket mount. This allows for movement about the axis of an upright camera support post but, as in the previous patent, no teaching of a plurality of separate mast portions having variable positional means is seen.

U.S. Pat. No. 3,351,988 issued on Nov. 14, 1967 to Harry D. Jamieson discloses a camera support clamp. In this device, a strap cooperates with a foot to secure the article to a support. Contrast this to the instant invention, where the clamping portion of the preferred embodiment comprises a pair of clamping members that grip opposing sides of whatever the mount is meant to be attached to.

Next is U.S. Pat. No. 3,952,982 issued on Apr. 27, 1976 to David P. Lewis. This is an all angle camera mount with a vernier adjustment. Unlike the instant invention, the mast portion of this device is a single shaft, without the required interlocking ball joints.

Lastly, U.S. Pat. No. 3,833,196 issued on Sep. 3, 1974 to John M. Protzman discloses a camera support. This device has clips and downwardly depending legs designed to engage a planar surface such as an automobile window. As in some of the other patents mentioned above, there is no teaching of the plurality of mast portions, each having its own adjustable and fixable ball joint.

None of the above inventions and patents, taken either singly or in combination, is seen to describe the instant invention as claimed.

SUMMARY OF THE INVENTION

Briefly, the invention comprises a base clamp, with a pair of opposing adjustable gripping surfaces to engage an environmental support, such as a bookshelf or a tree branch. In the preferred embodiment, removably attached to the base, is an adaptor designed to receive the mast portions of the device. The adaptor has a plurality of apertures for receiving the first mast portion, thus increasing the possible angles at which the masts can be set relative to the base clamp. Additionally, in the preferred embodiment, each of the mast portions has an integral ball joint that allows the mast to have a "zig-zag" shape through various angles, if desired. This allows the field of view of the camera to avoid intervening obstacles, and aids in concealment, if desired. In a second embodiment of the invention, the adaptor and masts are replaced by a resiliently deformable "goose neck" arrangement.

Accordingly, it is a principal object of the invention to provide a new and improved camera mount which overcomes the disadvantages of the prior art in a simple but effective manner.

It is a major object of this invention to provide a camera mount that allows for ease in mounting a camera in an environment where a non-linear path exists from a supporting surface to the area desired to be in the camera's field of view, such as in dense foliage or in a surveillance situation.

It is another object of the invention to provide a camera mount wherein the base of the device is comprised of a pair of opposed and adjustable gripping surfaces.

It is another object of the invention to provide a camera mount where an adaptor is provided between the base clamp and the mast that includes a plurality of apertures for receiving the mast, thus increasing the versatility of the device.

Yet another object of the invention is to provide a camera mount wherein the mast comprises a plurality of mast portions, each having a ball joint attached thereto, allowing for the mast to describe a tortuous path if necessary in relation to the adaptor and base.

Finally, it is a general goal of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawing.

The present invention meets or exceeds all the above objects and goals. Upon further study of the specification and appended claims, further objects and advantages of this invention will become apparent to those skilled in the art.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein:

FIG. 4 is a perspective view of a second embodiment of the invention.

DETAILED DESCRIPTION OF THE PREFERRED EMBODIMENTS

Figure 1:
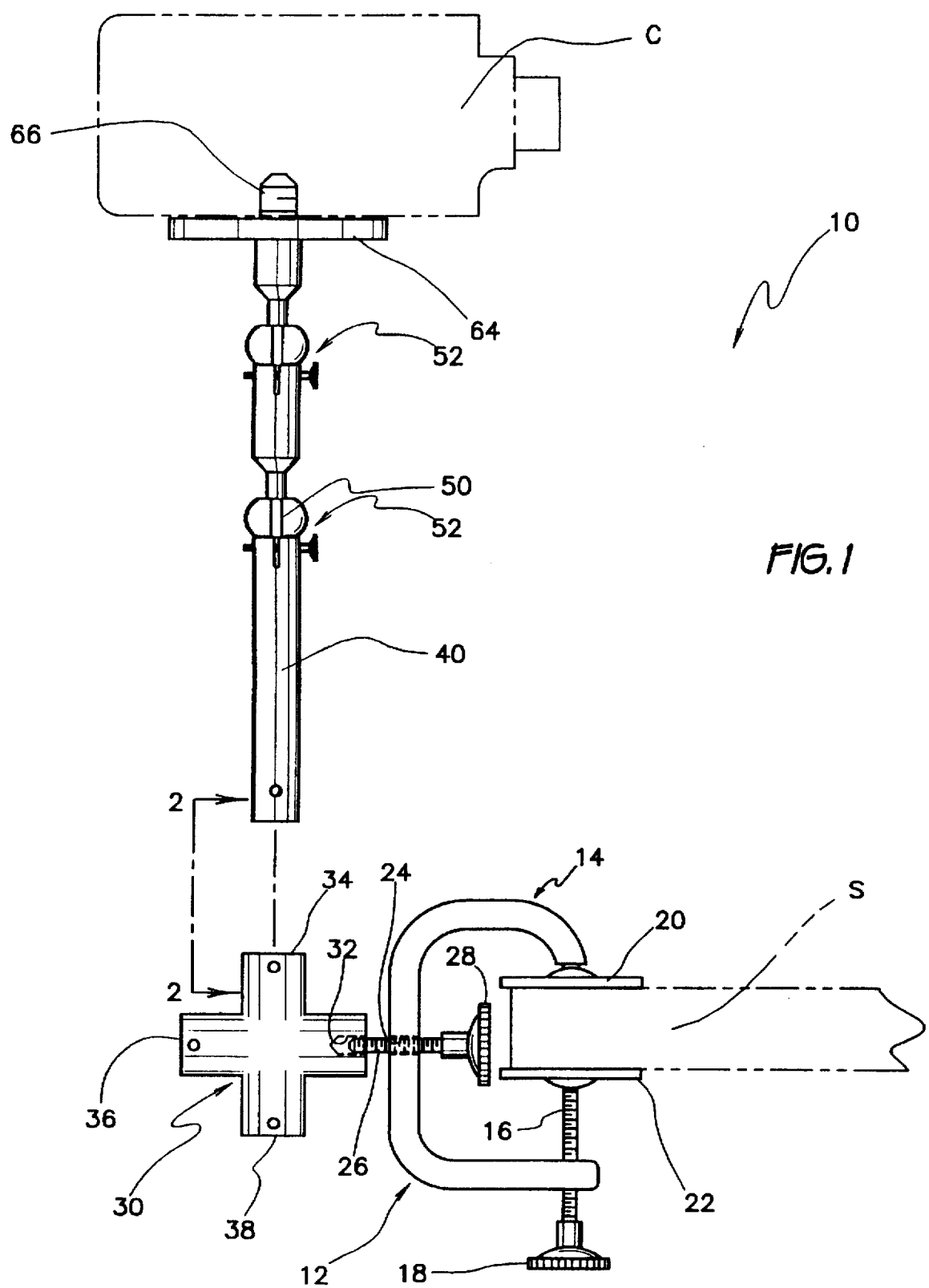
FIG. 1 environmental view of the present invention simply attached to a planar surface, such as a bookshelf.

The preferred embodiment of the present invention is generally, designated at 10 in FIG. 1. The discussion will first turn to the base clamp 12 (seen in FIG. 1). In the preferred embodiment, the base clamp 12 is a generally omega-shaped member having a fixed leg 14 and an adjustable leg 16. The adjustable leg 16 is preferably a simple threaded member with a handle 18 that allows for the gripping members 20, 22 to be brought into firm contact with the support S, in this Figure, a horizontal planar member such as bookcase shelf. The gripping members would preferably have, on their contact surfaces, a deformable or tacky substance that would decrease the likelihood of the mount 10 slipping inadvertently. In this preferred embodiment, a threaded bore 24 in the base clamp 12 receives an adaptor attachment means 26, shown here as a threaded member having an adjustment handle 28.

Figure 2:
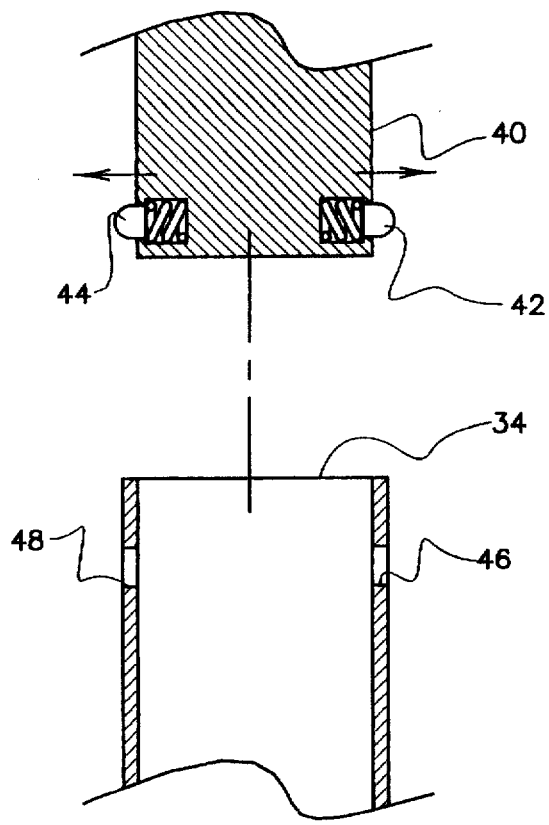
FIG. 2 is side view taken along line 2—2 of FIG. 1 showing the preferred ball detent arrangement between the first mast portion and the adaptor.

Still referring to FIG. 1, the adaptor 30 has therewithin an aperture 32 adapted to receive the end of the adaptor attachment means 26. The adaptor itself, in the embodiment pictured herein, has three socket members having substantially identical mast receiving apertures 34, 36, and 38. Although the socket members are identically constructed, each socket member is oriented in a direction different from that of the other socket members. It should be noted that more or fewer mast receiving apertures could be provided without departing from the spirit of the invention and these apertures do not have to lie in substantially the same plane, as is shown in the Figure. Turning to FIG. 2, the preferred means of mast attachment and detachment from the adaptor 30 will be discussed. Seen in both FIGS. 1 and 2 is first mast portion 40. This first mast portion 40 is preferably tubular in shape and has a diameter slightly less than the adaptor 30 such that it can be telescopically inserted therein. Disposed substantially opposite one another on first mast portion 40 are two ball detent means 42, 44. These are designed to cooperate with ball detent receiving apertures 46, 48 in the mast receiving aperture 34. It should be understood that the remaining mast receiving apertures 36, 38 in this preferred embodiment are substantially identical.

Figure 3:
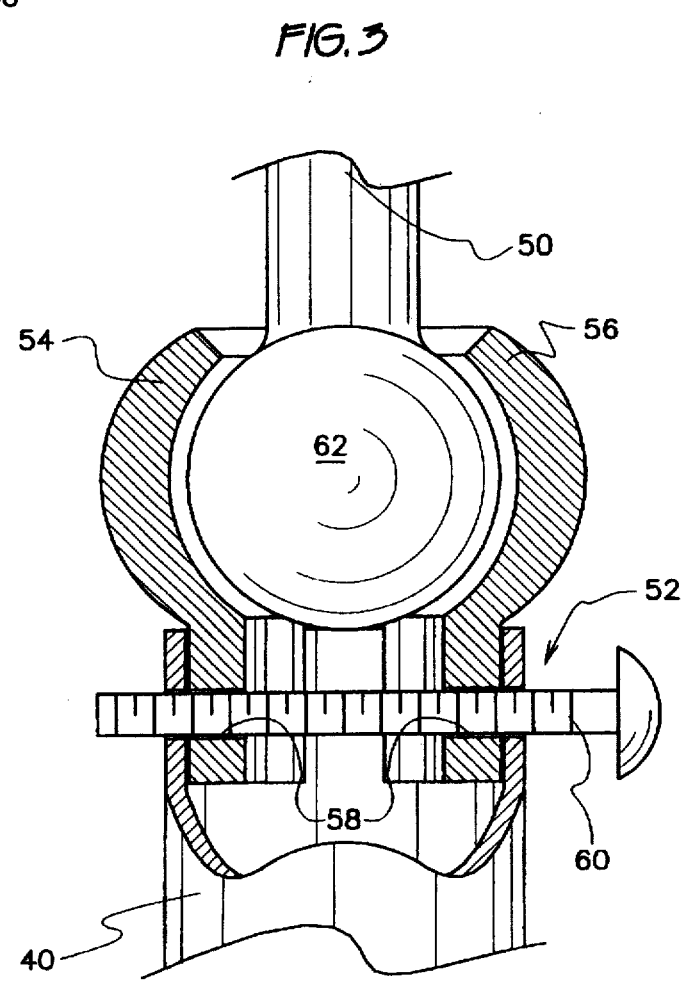
FIG. 3 is a side view of one of the mast ball joints used in the preferred embodiment of the invention.

Turning now to FIGS. 1 and 3, the ball joint mechanism of the instant invention will be discussed. Located at one end of each of the mast portions 40, 50 are ball joint receivers 52. Both receivers 52 are substantially identical and so only one will be discussed. Referring to FIG. 3, the first and second receiving members 54 and 56, respectively, are located on opposing sides of the mast portion 40. Each receiving member 54, 56 has a threaded aperture 58 therein adapted to receive ball joint clamp member 60. Held between the receiving members 54, 56 is a ball member 62. As is well known in the art, as clamp member 60 is tightened or loosened, ball member 62, and thus the second mast portion 50, integral therewith, is free to be rotated to any desired angle in relation to first mast portion 40. Similar to this arrangement is the relationship between the second mast portion 50 and the camera support member 64, seen in FIG. 1. Camera support portion 64 has a threaded protrusion 66 that is inserted into camera C to secure it to the mount 10. Thus it can be seen that with the novel construction of the instant invention a camera can be mounted at a wide variety of angles relative to the mounting surface S. Additionally, with the first and second mast portions 40 and 50 both having the ball joint receivers 52 and the corresponding cooperating ball members 62, the second mast portion 50 could be set at an angle to the central axis of the first mast portion 40, and likewise the camera support member 64 could be similarly adjusted in respect to the second mast portion 50. It should be noted that though only two mast portions are seen in the Figs. it would be within the scope of the invention to provide three or more.

Turning to FIG. 4, a second embodiment of the invention is seen indicated at 100. The base clamp portion 110 of this embodiment is substantially similar to the first embodiment of the invention. There is a fixed arm 112 and an adjustable arm 114 terminating in opposing gripping members 116, 118, respectively. A threaded aperture 120 receives the adaptor attachment means 122. In this embodiment the adaptor 124 has connected thereto a resiliently deformable "goose-neck" member 126. This terminates in the camera support 128 and the protruding threaded aperture 130 which is inserted into the camera C to attach it to the mount 100.

It is to be understood that the provided illustrative examples are by no means exhaustive of the many possible uses for my invention.

From the foregoing description, one skilled in the art can easily ascertain the essential characteristics of this invention and, without departing from the spirit and scope thereof, can make various changes and modifications of the invention to adapt it to various usages and conditions.

It is to be understood that the present invention is not limited to the sole embodiment described above, but encompasses any and all embodiments within the scope of the following claims:

I claim:

1. A camera mount for adjustably fixing a camera in a predetermined position in relation to a fixed support surface, comprising:

a base clamp portion for attaching said camera mount to the fixed support surface, said base clamp portion including a fixed leg terminating in a first gripping surface and an adjustable leg terminating in a second gripping surface;

an intermediate adaptor portion including removable attachment apparatus removably attaching said intermediate adaptor portion to said base clamp portion, said intermediate adaptor portion comprising a plurality of socket members each including a mast receiving aperture;

a mast portion having a first end including adaptor portion attachment apparatus attaching said mast portion to any one said mast receiving aperture of said adaptor portion and a second distal end including camera support attachment apparatus attaching said mast portion to a camera support member, said mast portion including adjustment apparatus for fixing said mast portion such that said camera support member is fixedly held in a predetermined position relative to the fixed support surface.

2. The camera mount as claimed in claim 1, wherein said mast portion further comprises a first mast member and a second mast member, said first mast member having an adaptor end including adaptor portion attachment apparatus and a second, distal end terminating in an adjustable ball receiving clamp, said second mast member having a first ball member adapted to cooperate with said adjustable ball receiving clamp of said distal end of said first mast member, and said second mast member also having a second, distal camera support ball receiving clamp and where said camera support attachment apparatus comprises a camera support ball member integral with said camera support member, said camera support ball member adapted to cooperate with said second mast member camera support ball receiving clamp; whereby both said second mast member and said camera support member may be fixed in relation to said first mast member and said second mast member, respectively.

3. The camera mount as claimed in claim 2, wherein said adaptor portion attachment apparatus comprises a ball detent.

4. The camera mount as claim 1, wherein said mast portion comprises a resiliently deformable tube.

5. The camera mount as claimed in claim 1, each one of said socket members oriented in a direction different from that of all other said socket members.

* * * * *